(12) United States Patent
Gutnik et al.

(10) Patent No.: US 8,193,912 B1
(45) Date of Patent: Jun. 5, 2012

(54) RFID TAG DYNAMICALLY ADJUSTING CLOCK FREQUENCY

(75) Inventors: Vadim Gutnik, Irvine, CA (US); Scott A. Cooper, Seattle, WA (US); John D. Hyde, Corvalis, OR (US)

(73) Assignee: Impinj, Inc., Seattle, WA (US)

( * ) Notice: Subject to any disclaimer, the term of this patent is extended or adjusted under 35 U.S.C. 154(b) by 717 days.

(21) Appl. No.: 12/403,344

(22) Filed: Mar. 12, 2009

Related U.S. Application Data

(60) Provisional application No. 61/036,422, filed on Mar. 13, 2008.

(51) Int. Cl.
*H04Q 5/22* (2006.01)

(52) U.S. Cl. ............... 340/10.1; 340/10.2; 340/10.3; 340/10.31; 340/10.32; 340/10.33; 340/10.34; 340/10.4; 340/10.41; 340/10.42; 340/10.5; 340/10.51; 340/10.52; 340/10.6; 340/572.1; 340/572.2; 340/572.3; 340/572.4; 340/572.5; 340/572.6; 340/572.7; 340/572.8; 340/572.9; 235/375; 235/376; 235/377; 235/378; 235/379; 235/380; 235/381; 235/382; 235/383; 235/384; 235/385

(58) Field of Classification Search ........ 340/10.1–10.6, 340/572.1–572.9; 235/375–385
See application file for complete search history.

(56) References Cited

U.S. PATENT DOCUMENTS

| | | | | |
|---|---|---|---|---|
| 5,482,139 A * | 1/1996 | Rivalto | ............... | 186/36 |
| 6,535,132 B2 * | 3/2003 | Waters et al. | ............... | 340/573.1 |
| 6,809,762 B1 * | 10/2004 | Donnelly et al. | ............. | 348/231.7 |
| 7,024,180 B2 * | 4/2006 | Waters et al. | ............... | 455/414.1 |
| 7,272,456 B2 * | 9/2007 | Farchmin et al. | ............... | 700/66 |
| 7,546,551 B2 * | 6/2009 | Sakata et al. | ............... | 715/841 |
| 7,665,040 B2 * | 2/2010 | Nakamura | ............... | 715/835 |
| 8,004,704 B2 * | 8/2011 | Shimoichi | ............... | 358/1.15 |
| 2002/0008626 A1 * | 1/2002 | Waters et al. | ............... | 340/573.1 |
| 2002/0013144 A1 * | 1/2002 | Waters et al. | ............... | 455/414 |
| 2003/0214532 A1 * | 11/2003 | Nakamura | ............... | 345/764 |
| 2004/0075735 A1 * | 4/2004 | Marmaropoulos | ............. | 348/51 |
| 2004/0100383 A1 * | 5/2004 | Chen et al. | ............... | 340/572.1 |
| 2005/0283804 A1 * | 12/2005 | Sakata et al. | ............... | 725/52 |
| 2005/0289478 A1 * | 12/2005 | Landman et al. | ............. | 715/804 |
| 2006/0028400 A1 * | 2/2006 | Lapstun et al. | ............... | 345/8 |
| 2006/0176508 A1 * | 8/2006 | Sugahara | ............... | 358/1.15 |
| 2007/0070397 A1 * | 3/2007 | Shimoichi | ............... | 358/1.15 |
| 2007/0277124 A1 * | 11/2007 | Shin et al. | ............... | 715/863 |
| 2008/0036757 A1 * | 2/2008 | Furukawa et al. | ............. | 345/418 |
| 2008/0189173 A1 * | 8/2008 | Bakar et al. | ............... | 705/14 |

FOREIGN PATENT DOCUMENTS

| | | | |
|---|---|---|---|
| EP | 714043 A1 * | 5/1996 |
| EP | 1071045 A1 * | 1/2001 |
| EP | 1653414 A2 * | 5/2006 |
| JP | 07013536 A * | 1/1995 |
| JP | 07210137 A * | 8/1995 |
| JP | 07281294 A * | 10/1995 |
| JP | 08161596 A * | 6/1996 |
| JP | 2006013938 A * | 1/2006 |

* cited by examiner

*Primary Examiner* — George Bugg
*Assistant Examiner* — Paul Obiniyi
(74) *Attorney, Agent, or Firm* — Turk IP Law, LLC

(57) ABSTRACT

RFID tags are configured to adjust their clock frequency in order to meet predefined limits for reply frequencies to conserve tag power. A deviation of computed tag reply frequency from a reader commanded reply frequency is used to determine an adjustment to the tag clock frequency. The tag clock frequency may be adjusted during backscatter and restored once backscattering is completed.

22 Claims, 13 Drawing Sheets

DECREASE OF TAG FREQUENCIES BASED ON DEVIATION FROM COMMANDED REPLY FREQUENCY

*RFID SYSTEM*

*RFID TAG*

SIGNAL PATH DURING R→T

SIGNAL PATH DURING T→R

*INCREASE OF TAG FREQUENCIES BASED ON DEVIATION FROM COMMANDED REPLY FREQUENCY*

DECREASE OF TAG FREQUENCIES BASED ON DEVIATION FROM COMMANDED REPLY FREQUENCY

*EXAMPLE TAG CIRCUITRY*

RFID TAG DYNAMICALLY ADJUSTING CLOCK FREQUENCY

CROSS REFERENCE TO RELATED APPLICATIONS

This application claims the benefit of U.S. Provisional Patent Application Ser. No. 61/036,422 filed on Mar. 13, 2008. The disclosure of the provisional patent application is hereby incorporated by reference for all purposes.

BACKGROUND

Radio Frequency Identification (RFID) systems typically include RFID tags and RFID readers. RFID readers are also known as RFID reader/writers or RFID interrogators. RFID systems can be used in many ways for locating and identifying objects to which the tags are attached. RFID systems are particularly useful in product-related and service-related industries for tracking objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. The RF wave is typically electromagnetic, at least in the far field. The RF wave can also be predominantly electric or magnetic in the near field.

A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on.

An RFID tag typically includes an antenna system, a radio section, a power management section, and frequently a logical section, a memory, or both. In earlier RFID tags, the power management section included an energy storage device, such as a battery. RFID tags with an energy storage device are known as active or semi-active tags. Advances in semiconductor technology have miniaturized the electronics so much that an RFID tag can be powered solely by the RF signal it receives. Such RFID tags do not include an energy storage device, and are called passive tags.

An RFID reader commands the tags within its field of view which frequency they are supposed to use in backscattering to the reader. A tag generates the commanded or desired backscatter frequency by dividing its internal oscillator frequency typically by an integer number. Higher oscillator frequencies give tags more options to divide the oscillator frequency by an integer and derive a backscatter frequency close to the commanded or desired backscatter frequency. However, higher internal clock frequencies also mean higher power consumption for the tag, which is available in limited quantities only.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to an RFID tag configured to adjust its clock frequency in order to meet predefined limits for reply frequencies to conserve tag power. According to some embodiments, a deviation of computed tag reply frequency from the reader commanded reply frequency is used to determine an adjustment to the tag clock frequency. The tag clock frequency may be adjusted during backscatter and optionally restored once backscattering is completed.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying Drawings, in which.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

Figure 1:
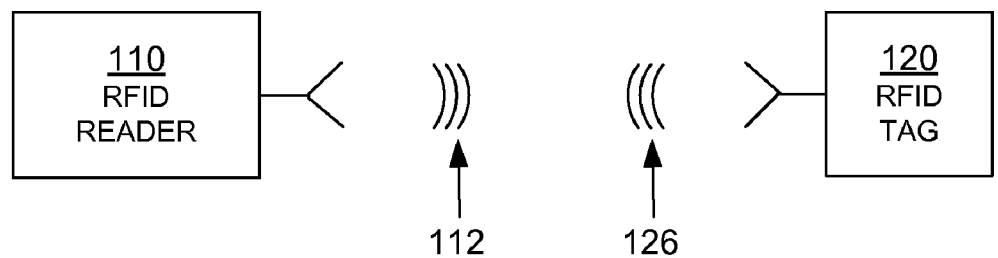
FIG. 1 is a block diagram of components of an RFID system.

FIG. 1 is a diagram of components of a typical RFID system 100, incorporating embodiments. An RFID reader 110 transmits an interrogating Radio Frequency (RF) wave 112. RFID tag 120 in the vicinity of RFID reader 110 may sense interrogating RF wave 112, and generate wave 126 in response. RFID reader 110 senses and interprets wave 126.

Reader 110 and tag 120 exchange data via wave 112 and wave 126. In a session of such an exchange each encodes, modulates, and transmits data to the other, and each receives, demodulates, and decodes data from the other. The data can be modulated onto, and demodulated from, RF waveforms. The RF waveforms are in a suitable range of frequencies. Such ranges include those near 900 MHz, 2.4 GHz, and so on.

Encoding the data in waveforms can be performed in a number of different ways. For example, protocols are devised to communicate in terms of symbols, also called RFID symbols. A symbol for communicating can be a delimiter, a calibration symbol, and so on. Further symbols can be implemented for ultimately exchanging binary data, such as "0" and "1", if that is desired. In turn, when the waveforms are processed internally by reader 110 and tag 120, they can be equivalently considered and treated as numbers having corresponding values, and so on.

Tag 120 can be a passive tag or an active or semi-active tag, i.e., having its own power source. Where tag 120 is a passive tag, it is powered from wave 112.

Figure 2:
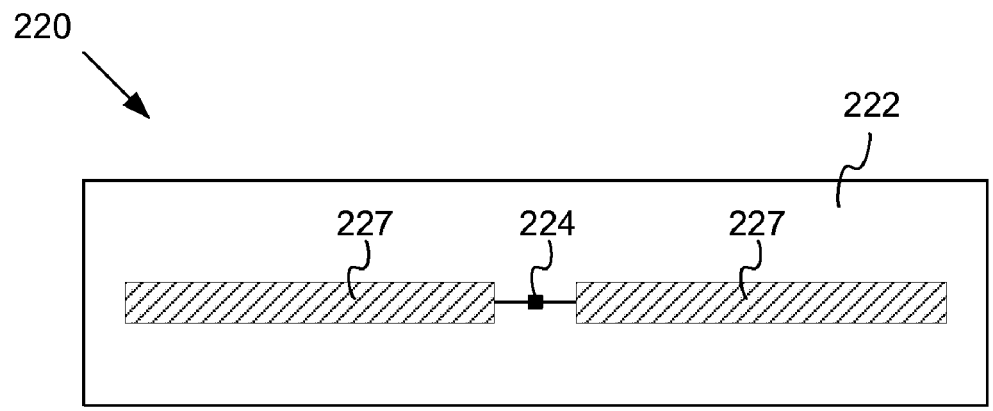
FIG. 2 is a diagram showing components of a passive RFID tag, such as a tag that can be used in the system of FIG. 1.

FIG. 2 is a diagram of an RFID tag 220, which can be the same as tag 120 of FIG. 1. Tag 220 is implemented as a passive tag, meaning it does not have its own power source. Much of what is described in this document, however, applies also to active tags.

Tag 220 is formed on a substantially planar inlay 222, which can be made in many ways known in the art. Tag 220 includes an electrical circuit, which is preferably implemented in an integrated circuit (IC) 224. IC 224 is arranged on inlay 222.

Tag 220 also includes an antenna for exchanging wireless signals with its environment. The antenna is usually flat and attached to inlay 222. IC 224 is electrically coupled to the antenna via suitable antenna ports (not shown in FIG. 2).

The antenna may be made in a number of ways, as is well known in the art. In the example of FIG. 2, the antenna is made from two distinct antenna segments 227, which are shown here forming a dipole. Many other embodiments are possible, using any number of antenna segments.

In some embodiments, an antenna can be made with even a single segment. Different points of the segment can be coupled to one or more of the antenna ports of IC 224. For example, the antenna can form a single loop, with its ends coupled to the ports. It should be remembered that, when the single segment has more complex shapes, even a single segment could behave like multiple segments, at the frequencies of RFID wireless communication.

In operation, a signal is received by the antenna, and communicated to IC 224. IC 224 both harvests power, and responds if appropriate, based on the incoming signal and its internal state. In order to respond by replying, IC 224 modulates the reflectance of the antenna, which generates the backscatter from a wave transmitted by the reader. Coupling together and uncoupling the antenna ports of IC 224 can modulate the reflectance, as can a variety of other means.

In the embodiment of FIG. 2, antenna segments 227 are separate from IC 224. In other embodiments, antenna segments may alternately be formed on IC 224, and so on.

The components of the RFID system of FIG. 1 may communicate with each other in any number of modes. One such mode is called full duplex. Another such mode is called half-duplex, and is described below.

Figure 3:
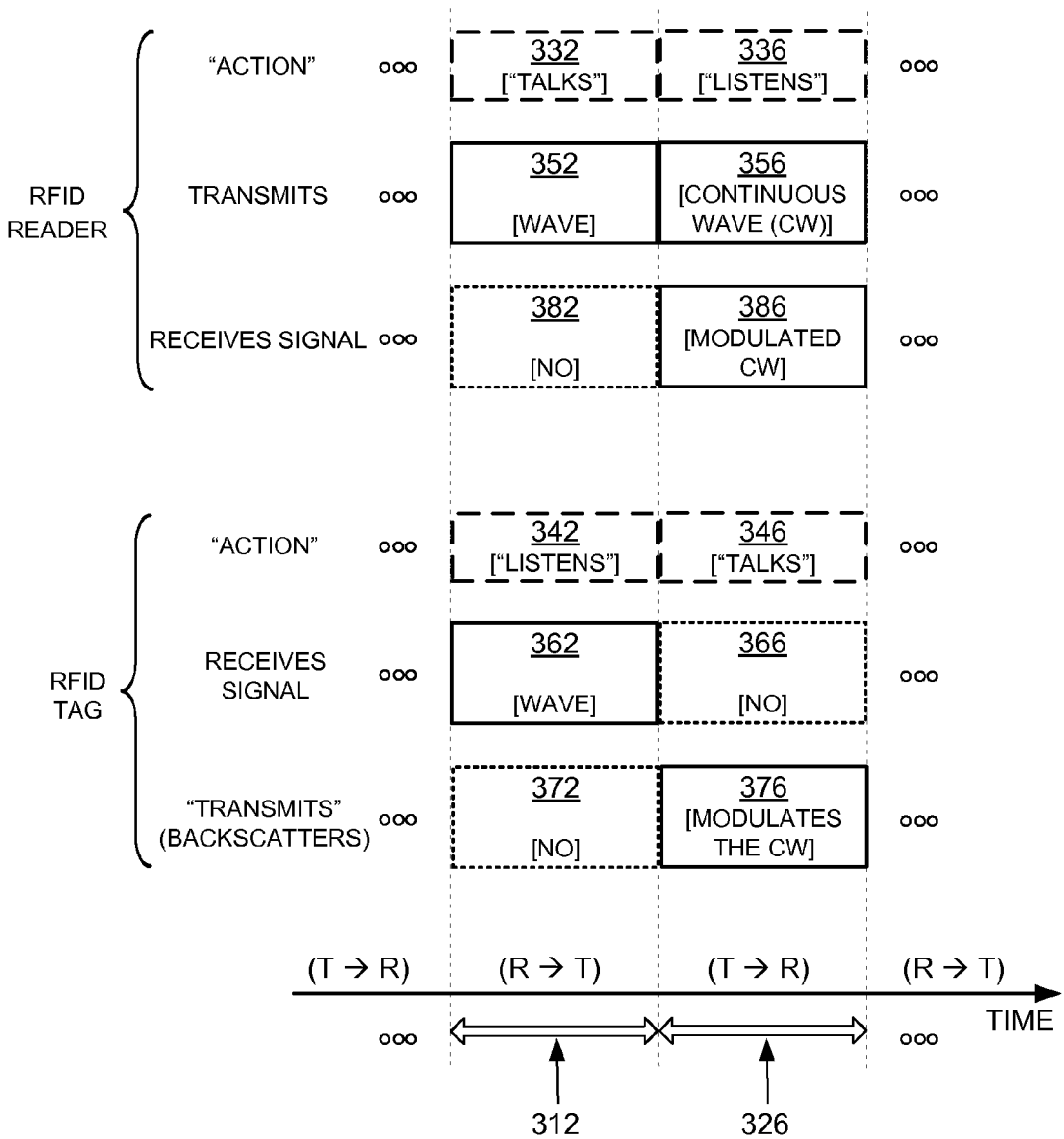
FIG. 3 is a conceptual diagram for explaining a half-duplex mode of communication between the components of the RFID system of FIG. 1.

FIG. 3 is a conceptual diagram 300 for explaining the half-duplex mode of communication between the components of the RFID system of FIG. 1, especially when tag 120 is implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual technical behavior, during interval 312, reader 110 talks to tag 120 as follows. According to block 352, reader 110 transmits wave 112, which was first described in FIG. 1. At the same time, according to block 362, tag 120 receives wave 112 and processes it, to extract data and so on. Meanwhile, according to block 372, tag 120 does not backscatter with its antenna, and according to block 382, reader 110 has no wave to receive from tag 120.

During interval 326, tag 120 talks to reader 110 as follows. According to block 356, reader 110 transmits a Continuous Wave (CW), which can be thought of as a carrier signal that ideally encodes no information. As discussed before, this carrier signal serves both to be harvested by tag 120 for its own internal power needs, and also as a wave that tag 120 can backscatter. Indeed, during interval 326, according to block 366, tag 120 does not receive a signal for processing. Instead, according to block 376, tag 120 modulates the CW emitted according to block 356, so as to generate backscatter wave 126. Concurrently, according to block 386, reader 110 receives backscatter wave 126 and processes it.

In the above, an RFID reader/interrogator may communicate with one or more RFID tags in any number of ways. Some such ways are described in protocols. A protocol is a specification that calls for specific manners of signaling between the reader and the tags.

One such protocol is called the Specification for RFID Air Interface-EPC™ Radio-Frequency Identity Protocols Class-1 Generation-2 UHF RFID Protocol for Communications at 860 MHz-960 MHz, which is also colloquially known as "the Gen2 Spec". The Gen2 Spec has been ratified by EPCglobal, which is an organization that maintains a website at: <http://www.epcglobalinc.org/> at the time this document is initially filed with the USPTO.

In addition, a protocol can be a variant of a stated specification such as the Gen2 Spec, for example including fewer or additional commands than the stated specification calls for, and so on. In such instances, additional commands are sometimes called custom commands.

It was described above how reader 110 and tag 120 communicate in terms of time. In addition, communications between reader 110 and tag 120 may be restricted according to frequency. One such restriction is that the available frequency spectrum may be partitioned into divisions that are called channels. Different partitioning manners may be specified by different regulatory jurisdictions and authorities (e.g. FCC in North America, CEPT in Europe, etc.).

Reader 110 typically transmits with a transmission spectrum that lies within one channel. In some regulatory jurisdictions the authorities permit aggregating multiple channels into one or more larger channels, but for all practical purposes an aggregate channel can again be considered a single, albeit larger, individual channel.

Tag 120 can respond with a backscatter that is modulated directly onto the frequency of the reader's emitted CW, also called baseband backscatter. Alternatively, tag 120 can respond with a backscatter that is modulated onto a frequency, developed by tag 120, that is different from the reader's emitted CW, and this modulated tag frequency is then impressed upon the reader's emitted CW. This second type of backscatter is called subcarrier backscatter. The subcarrier frequency can be within the reader's channel, can straddle the boundaries with the adjacent channel, or can be wholly outside the reader's channel.

A reader commands a tag its reply frequency (backscatter frequency) employing a Tag-To-Reader calibration symbol or TRcal. The TRcal symbol is typically included in the preamble transmitted by the reader. The reader may further provide the tag with a divide ratio (DR) in a payload of a Query command that initiates an inventory round. The tag measures TRcal(time) using its clock frequency and then determines TRcal(count) by computing TRcal(time)*f (internal clock frequency). TRcal(count) is used by the tag to calculate an integer, N, dividing TRcal(count) to DR and computing a rounded number from the division. In many tags, the tag's internal clock frequency divided by that integer number, N, to arrive at the actual reply (backscatter) frequency.

Figure 4:
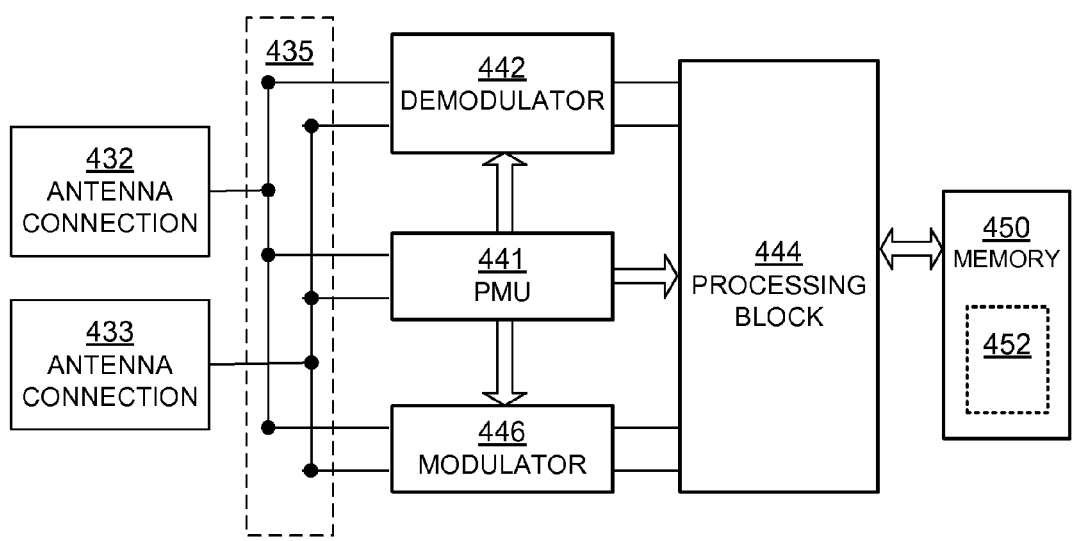
FIG. 4 is a block diagram showing a detail of an RFID tag, such as the one shown in FIG. 1.

FIG. 4 is a block diagram showing a detail of an RFID tag, such as the one shown in FIG. 1. Electrical circuit 424 in FIG. 4 may be formed in an IC of an RFID tag, such as IC 224 of FIG. 2. Circuit 424 has a number of main components that are described in this document. Circuit 424 may have a number of additional components from what is shown and described, or different components, depending on the exact implementation.

Circuit 424 includes at least two antenna connections 432, 433, which are suitable for coupling to one or more antenna segments (not shown in FIG. 4). Antenna connections 432, 433 may be made in any suitable way, such as using pads and so on. In a number of embodiments more than two antenna connections are used, especially in embodiments where more antenna segments are used.

Circuit 424 includes a section 435. Section 435 may be implemented as shown, for example as a group of nodes for proper routing of signals. In some embodiments, section 435 may be implemented otherwise, for example to include a receive/transmit switch that can route a signal, and so on.

Circuit 424 also includes a Power Management Unit (PMU) 441. PMU 441 may be implemented in any way known in the art, for harvesting raw RF power received via antenna connections 432, 433. In some embodiments, PMU 441 includes at least one rectifier, and so on.

In operation, an RF wave received via antenna connections 432, 433 is received by PMU 441, which in turn generates power for components of circuit 424. This is true for either or both reader-to-tag (R→T) and tag-to-reader (T→R) sessions, whether or not received RF wave is modulated.

Circuit 424 additionally includes a demodulator 442. Demodulator 442 demodulates an RF signal received via antenna connections 432, 433. Demodulator 442 may be implemented in any way known in the art, for example including an attenuator stage, an amplifier stage, and so on.

Circuit 424 further includes a processing block 444. Processing block 444 receives the demodulated signal from demodulator 442, and may perform operations. In addition, it may generate an output signal for transmission.

Processing block 444 may be implemented in any way known in the art. For example, processing block 444 may include a number of components, such as a processor, memory, a decoder, an encoder, and so on.

Circuit 424 additionally includes a modulator 446. Modulator 446 modulates an output signal generated by processing block 444. The modulated signal is transmitted by driving antenna connections 432, 433, and therefore driving the load presented by the coupled antenna segment or segments. Modulator 446 may be implemented in any way known in the art, for example including a driver stage, amplifier stage, and so on.

In one embodiment, demodulator 442 and modulator 446 may be combined in a single transceiver circuit. In another embodiment, modulator 446 may include a backscatter transmitter or an active transmitter. In yet other embodiments, demodulator 442 and modulator 446 are part of processing block 444.

Circuit 424 additionally includes a memory 450, which stores data 452. Memory 450 is preferably implemented as a Nonvolatile Memory (NVM), which means that data 452 is retained even when circuit 424 does not have power, as is frequently the case for a passive RFID tag.

In terms of processing a signal, circuit 424 operates differently during a R→T session and a T→R session. The different operations are described below, in this case with circuit 424 representing an RFID tag.

Figure 5A:
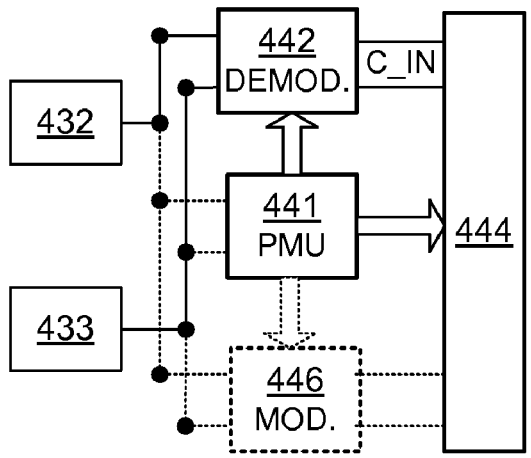
FIGS. 5A and 5B illustrate signal paths during tag-to-reader and reader-to-tag communications in the block diagram of FIG. 4.

FIG. 5A shows version 524-A of components of circuit 424 of FIG. 4, further modified to emphasize a signal operation during a R→T session (receive mode of operation) during time interval 312 of FIG. 3. An RF wave is received from antenna connections 432, 433, and then a signal is demodulated from demodulator 442, and then input to processing block 444 as C_IN. In one embodiment, C_IN may include a received stream of symbols.

Version 524-A shows as relatively obscured those components that do not play a part in processing a signal during a R→T session. Indeed, PMU 441 may be active, but only in converting raw RF power. And modulator 446 generally does not transmit during a R→T session. Modulator 446 typically does not interact with the received RF wave significantly, either because switching action in section 435 of FIG. 4 decouples the modulator 446 from the RF wave, or by designing modulator 446 to have a suitable impedance, and so on.

While modulator 446 is typically inactive during a R→T session, it need not be always the case. For example, during a R→T session, modulator 446 could be active in other ways. For example, it could be adjusting its own parameters for operation in a future session.

Figure 5B:
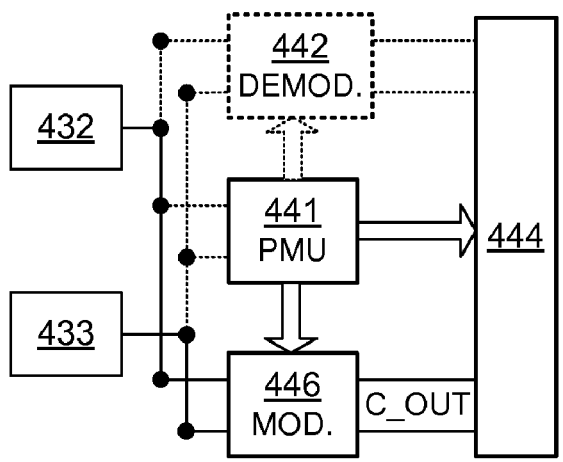

FIG. 5B shows version 524-B of components of circuit 424 of FIG. 4, further modified to emphasize a signal operation during a T→R session during time interval 326 of FIG. 3. A signal is output from processing block 444 as C_OUT. In one embodiment, C_OUT may include a transmission stream of symbols. C_OUT is then modulated by modulator 446, and output as an RF wave via antenna connections 432, 433.

Version 524-B shows as relatively obscured those components that do not play a part in processing a signal during a T→R session. Indeed, PMU 441 may be active, but only in converting raw RF power. And demodulator 442 generally does not receive during a T→R session. Demodulator 442 typically does not interact with the transmitted RF wave, either because switching action in section 435 decouples the demodulator 442 from the RF wave, or by designing demodulator 442 to have a suitable impedance, and so on.

While demodulator 442 is typically inactive during a T→R session, it need not be always the case. For example, during a T→R session, demodulator 442 could be active in other ways. For example, it could be adjusting its own parameters for operation in a future session.

Figure 6:
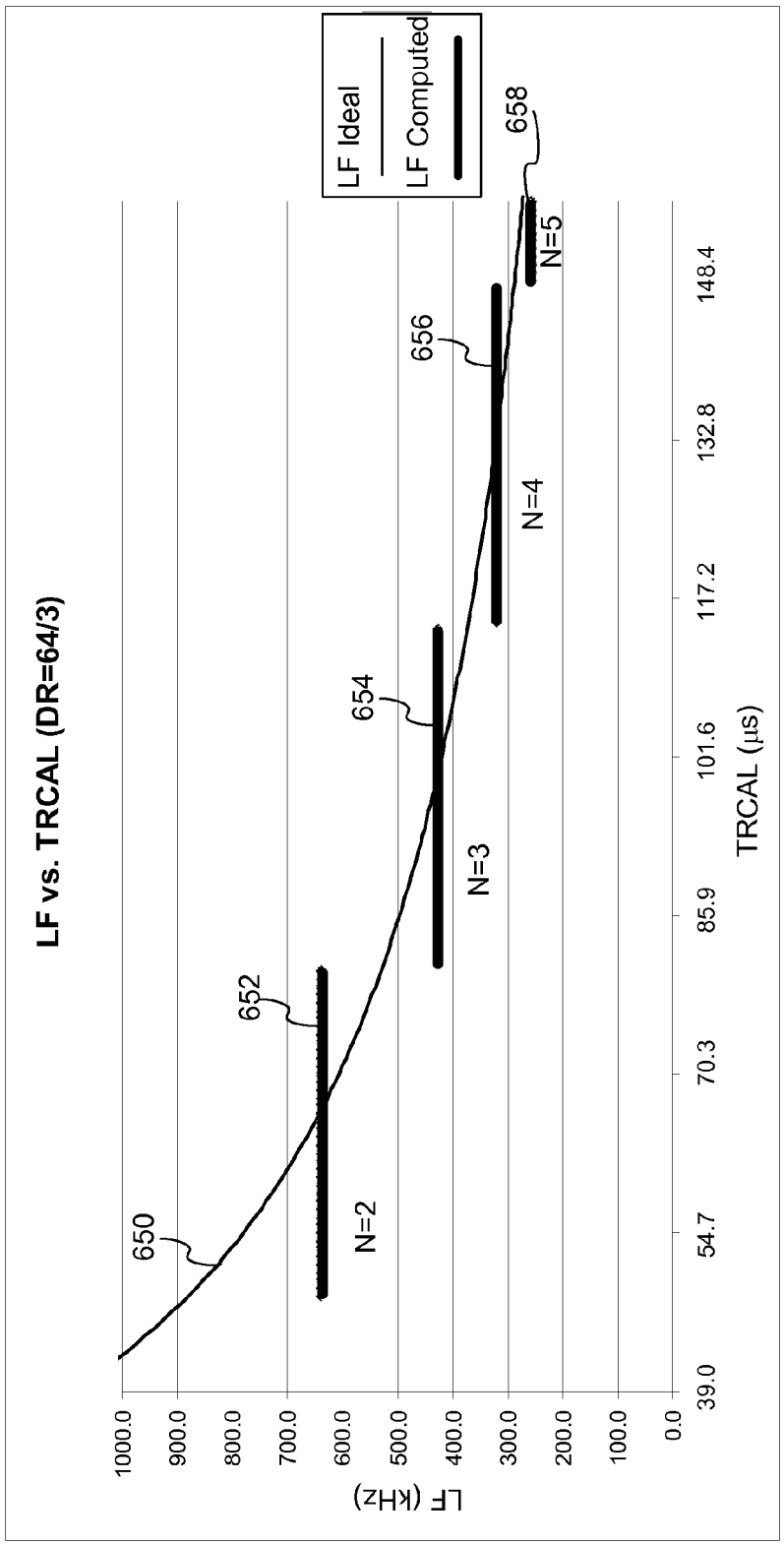
FIG. 6 is a diagram illustrating an ideal commanded backscatter frequency and ranges of computed backscattered frequencies derived by dividing the tag's internal oscillator frequency by different integer numbers.

FIG. 6 is a diagram illustrating an ideal commanded backscatter frequency and ranges of computed backscattered frequencies derived by dividing the tag's internal oscillator frequency by different integer numbers.

As discussed previously, a reader commands a tag its backscatter frequency through a TRcal symbol included in a preamble of a Query command and a divide ratio DR included in a payload of the Query command. The tag determines the base frequency from duration of the TRcal symbol, then computes DR/TRcal ratio to arrive at the reader commanded reply frequency $LF_{IDEAL}$. DR may have a value of 8 or 64/3 in tags compliant with the Gen 2 Specification described above.

In practice, the tag measures TRcal using its internal oscillator and determining TRcal(counts) as $f_{oscillator}$*TRcal (time). Some tags then determine an integer number, N, (e.g. N=Floor(TRcal/DR+9/16)) and dividing its internal oscillator frequency by the integer number to arrive at the computed reply frequency $LF_{COMPUTED}$ ($LF_{COMPUTED}=f_{oscillator}/N$). Since tag oscillator frequencies may vary for a number of reasons (oscillator type, temperature, etc.), the computed reply frequencies are usually within a predefined range of the reader commanded tag reply frequency $LF_{IDEAL}$. Indeed, standards such as the Gen 2 Specification define limits for tag reply frequencies based on the ideal reply frequency as error rates.

Diagram 600 illustrates reader commanded reply frequency $LF_{IDEAL}$ (650) and ranges for actual tag reply frequencies based on different integer numbers, N, that may be computed by the tag ($LF_{COMPUTED}$). The frequencies are shown based on TRcal(time) values that may be measured by the tag.

For example, for N=2, the tag may reply within range 652. Similarly, for N=3, the tag may reply in range 654, for N=4, the tag may reply in range 656, for N=5, the tag may reply in range 658, and so on. The integer number, N, is determined based on the tag's oscillator frequency for a given $LF_{IDEAL}$.

It should be noted that for higher tag oscillator frequencies, potentially more reply frequencies are available to a tag making it easier for the tag to employ an $LF_{COMPUTED}$ that is closer to the $LF_{IDEAL}$. For example, a tag with 1920 kHz internal oscillator can backscatter at 1920/3=640 kHz, 1920/4=480 kHz, 1920/5=384 kHz, and so on. Worst-case fractional error for this tag is at 560 kHz: (560−480)/560=14.2% based on a reader commanded reply frequency of 560 kHz. Another tag with a 1280 kHz oscillator can backscatter at 1280/2=640 kHz, 1280/3=427 kHz, 1280/4=320 kHz, and so on. Worst-case fractional error for this tag is at 533 kHz: (533−427)/533=20% (or (533−640)/640=−20%) for a reader commanded frequency of 533 kHz. Thus, the higher the tag frequency, the smaller the tag's reply frequency error. However, higher tag frequencies mean higher power consumption for the tag. Since passive RFID tags receive their power from the RF signal transmitted by the reader, and that power is limited in quantity, lower tag oscillator frequencies are preferred for power conservation purposes.

Embodiments also include methods. An economy is achieved in the present document in that a single description is sometimes given for both methods according to embodiments, and functionalities of devices made according to embodiments. Plus, a single set of flowcharts is sometimes used to describe methods in and of themselves, along with operations of hardware and/or software and/or firmware where applicable. This is regardless of how each element is implemented.

Embodiments may additionally include programs, and methods of operation of the programs such as algorithms executed by a processing block of a tag according to embodiments to determine an adjusted reply frequency for the tag based on the tag's clock frequency and a reader commanded reply frequency as discussed herein. A program is generally defined as a group of steps or operations leading to a desired result, due to the nature of the elements in the steps and their sequence. A program is usually advantageously implemented as a sequence of steps or operations for a processor, such as the structures described above.

Performing the steps, instructions, or operations of a program requires manipulation of physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

Embodiments furthermore include storage media. Such media, individually or in combination with others, have stored thereon instructions of a program made according to the embodiments. A storage medium according to the embodiments is a computer-readable medium, such as a memory, and is read by a processor of the type mentioned above. If a memory, it can be implemented in a number of ways, such as Read Only Memory (ROM), Random Access Memory (RAM), etc., some of which are volatile and some non-volatile.

Often, for the sake of convenience only, it is desirable to implement and describe a program as software. The software can be unitary, or thought in terms of various interconnected distinct software modules.

This detailed description is presented largely in terms of flowcharts, algorithms, and symbolic representations of operations on data bits on and/or within at least one medium that allows computational operations, such as a tag with memory. Indeed, such descriptions and representations are the type of convenient labels used by those skilled in programming and/or the data-processing arts to effectively convey the substance of their work to others skilled in the art. A person skilled in the art of programming may use these descriptions to readily generate specific instructions for implementing a program according to the present disclosure.

Some methods described herein are for the operation of RFID tags, and of chips that are intended for use with RFID tags, whether IC chips, or made from organic semiconductors, etc. These methods can be implemented in any number of ways, including the structures described in this document.

Figure 7:
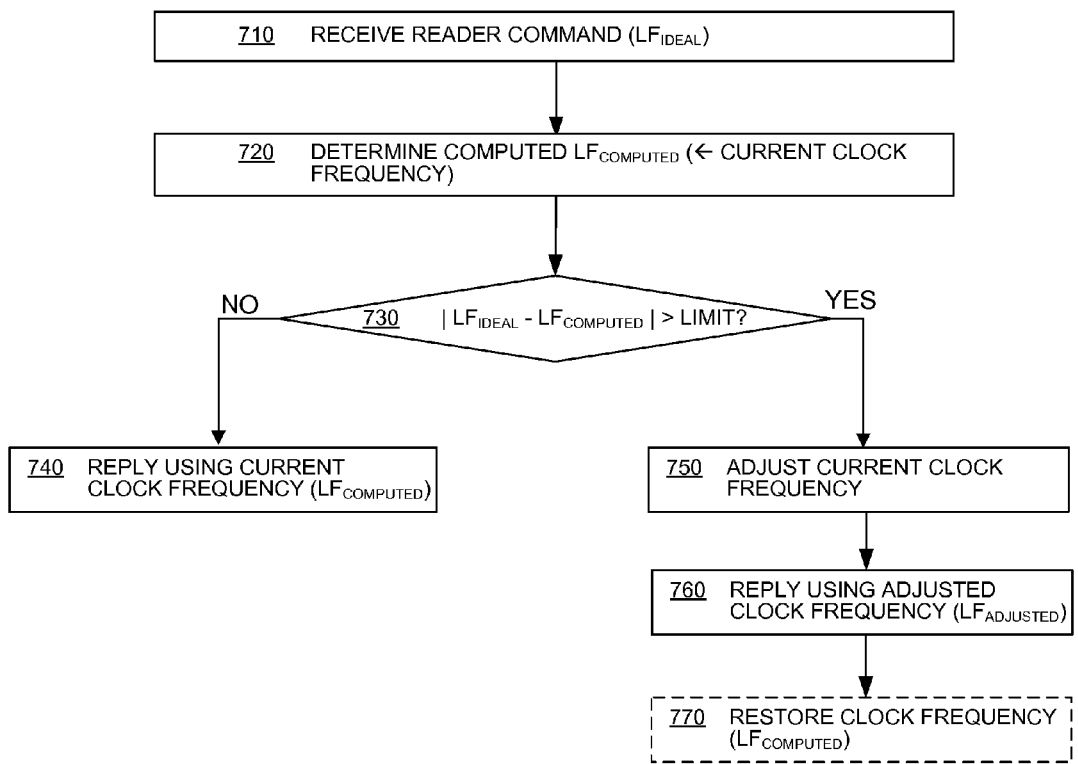
FIG. 7 is a flowchart for a process of dynamically adjusting tag clock frequency according to embodiments.

FIG. 7 is a flowchart for a process of dynamically adjusting tag clock frequency according to embodiments. As mentioned previously, higher clock frequencies in tags enable the tags to reply with frequencies closer to the reader commanded reply frequency reducing frequency errors. On the other hand, high clock frequencies result in increased power consumption at the tag. In a tag according to embodiments, main clock frequency of the tag is adjusted during a portion of the tag operation such as backscattering to minimize the backscattering frequency error.

Process 700 begins with the tag receiving a reader command such as a Query command dictating to the tag its reply frequency ($LF_{IDEAL}$) at operation 710. At following operation 720, the tag determines its reply frequency, $LF_{COMPUTED}$, based on its current clock frequency and the $LF_{IDEAL}$. The $LF_{COMPUTED}$ is determined from a TRCAL value of the reader command and the divide ratio, DR, as described previously. According to one embodiment, this may be accomplished by determining an integer number and a remainder through dividing the current clock frequency of the tag by the $LF_{IDEAL}$. The tag may then determine the $LF_{COMPUTED}$ based on dividing the current clock frequency of the tag by the integer number.

In an example implementation of the embodiments, the integer number, N, may be computed as:

$$N = \left[\frac{TRcal(\text{time}) * f_{oscillator} + \text{offset}}{DR}\right]_{INT}, \quad [1]$$

where
TRcal(time) is a time based value of the duration of TRcal symbol as measured by the tag;
$f_{oscillator}$ is the tag's clock frequency;
offset is a predefined offset value for shifting the frequency as needed; and
DR is the reader defined divide ratio.

At decision operation 730, a determination is made whether a difference between $LF_{IDEAL}$ and $LF_{COMPUTED}$ exceeds a predefined limit. The predefined limit may be a standard based limit such as Gen 2 Specification. If $LF_{COMPUTED}$ is within the prescribed limit, the tag may backscatter a reply signal using $LF_{COMPUTED}$ based on the current clock frequency at operation 740.

If the predefined limit is exceeded, the current clock frequency may be adjusted at operation 750. The adjustment may include incrementing or decrementing the current clock frequency based on whether $LF_{IDEAL}$ is larger or smaller than $LF_{COMPUTED}$. The adjustment may also be performed based on computing a remainder of the division performed at equation [1] and employing a look-up table or a predefined function to determine a "boost factor" for incrementing or decrementing the clock frequency. The adjustment may be "coarse" (i.e. using relatively small number of frequency adjustment values) or "fine" (i.e. using a relatively large number of frequency adjustment values).

According to other embodiments, the adjustment may further include modifying the integer number computed at equation [1]. According to further embodiments, the current clock frequency may be adjusted such that the $LF_{IDEAL}$ is a non-integer multiple of the $LF_{ADJUSTED}$.

At operation 760, the tag backscatters to the reader a reply signal using the adjusted frequency $LF_{ADJUSTED}$. The tag's clock frequency may be restored to its original value upon completion of the backscattering at optional operation 770. While the clock frequency adjustment may be performed during the backscattering period, embodiments are not limited to adjustment during this operational period. The tag may modify its clock frequency prior to backscattering and restore upon expiration of a preset period after the backscattering is completed.

The operations included in process 700 are for illustration purposes. Adjusting a tag's clock frequency for power conservation may be implemented by similar processes with fewer or additional steps, as well as in different order of operations using the principles described herein.

Figure 8:
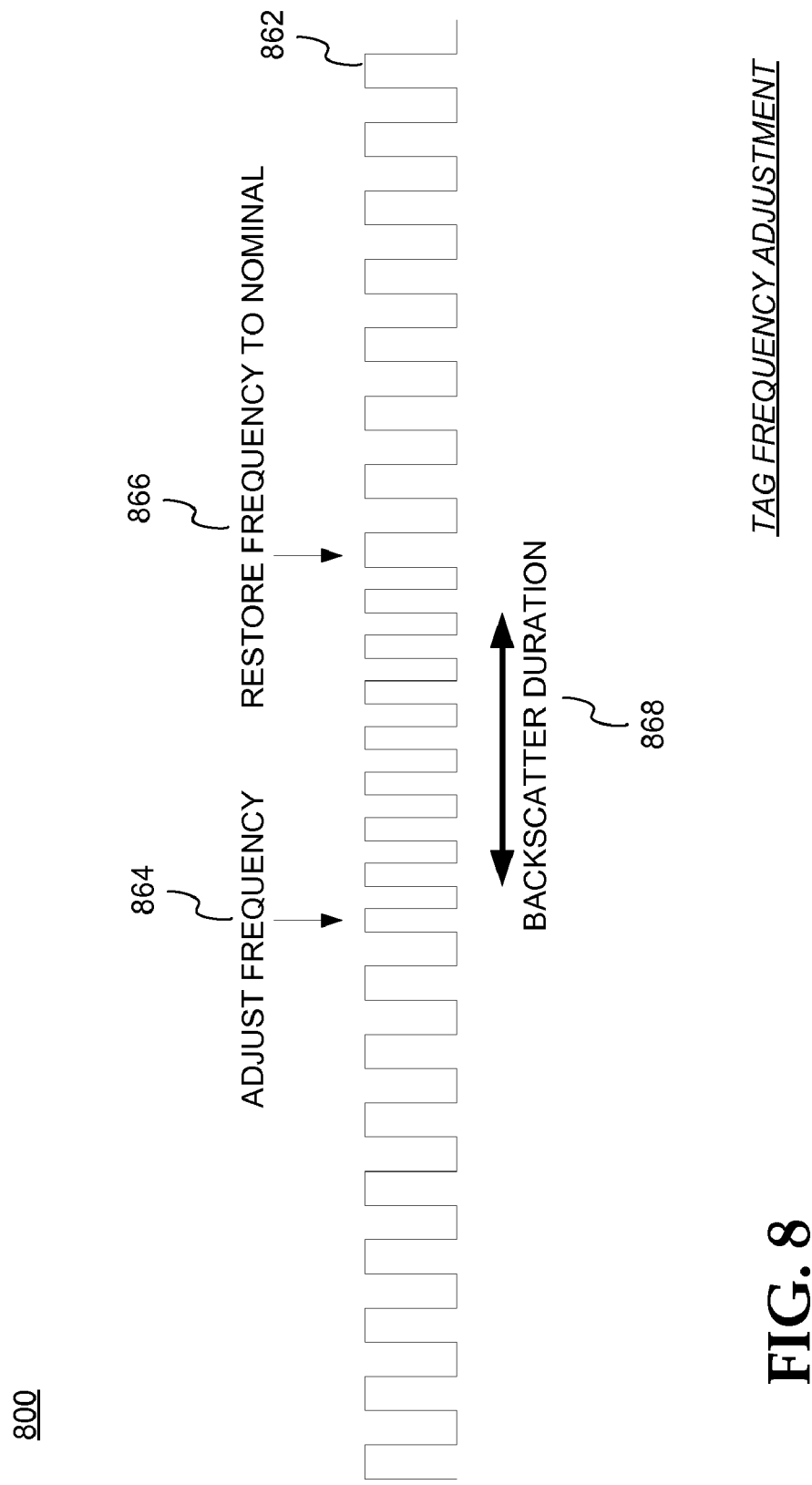
FIG. 8 illustrates adjustment of tag clock frequency during backscatter period in a tag according to one embodiment.

FIG. 8 illustrates adjustment of tag clock frequency during backscatter period in a tag according to one embodiment. While the tag clock frequency may be increased or decreased according to embodiments, the main clock frequency may be set to a low value to conserve tag power according to one embodiment. According to the same embodiment, the clock frequency may be increased temporarily to derive an accurate tag reply frequency ($LF_{ADJUSTED}$) during backscattering and restored to its original value once the backscattering is completed as shown in diagram 800.

Thus, tag clock frequency 862 is adjusted (increased) (864) shortly prior to backscattering 868 and restored to its nominal value (866) when the backscattering duration 868 is finished. This way, the tag consumes less power with the lower clock frequency when it is not backscattering while minimizing its reply frequency error through the frequency adjustment.

Figure 9A:
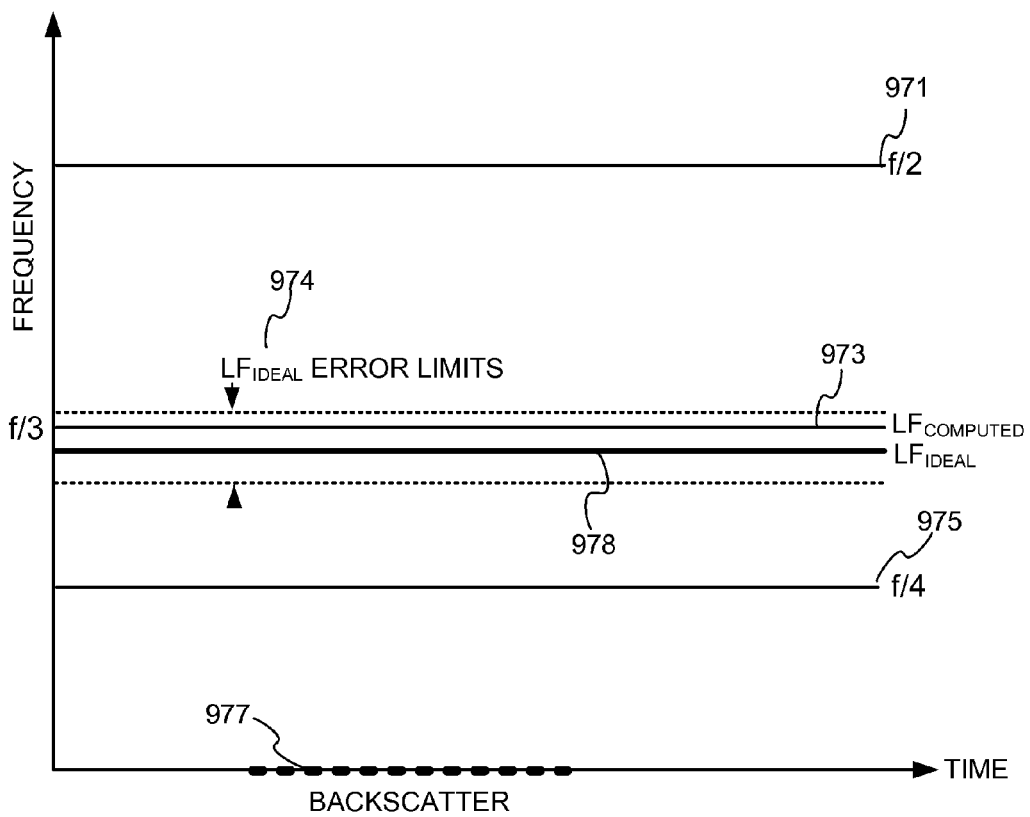
FIG. 9A illustrates how tag clock frequency may be left without adjustment when an expected variation of the computed backscatter frequency from the commanded backscatter frequency is within specified limits in a tag according to embodiments.

FIG. 9A illustrates how tag clock frequency may be left without adjustment when an expected variation of the computed backscatter frequency from the commanded backscatter frequency is within specified limits in a tag according to embodiments.

Reader commanded tag reply frequency may vary depending on the system, reader type, regulatory requirements, and other reasons. As discussed previously, standards such as the Gen 2 Specification define limits for tags reply frequencies. Thus, for each reader commanded tag reply frequency, there is a range of frequencies that may be used by the tag to backscatter at and still comply with the requirements. In diagram 970, this range of acceptable reply frequencies is shown as the range within $LF_{IDEAL}$ error limits 974, where $LF_{IDEAL}$ 978 is the reader commanded reply frequency. Available tag reply frequencies based on the tag's internal clock frequency include f/2 (971), f/3 (973) and f/4 (975). Since f/3 (973) is already within the acceptable range, the tag determines that frequency as $LF_{COMPUTED}$ and does not need to change fin order to comply with the frequency requirement outside or during backscattering period 977.

The adjustment of tag frequency according to some embodiments may be dynamic. As discussed above, the tag may maintain its clock frequency if no change is needed. On the other hand, the tag may determine $LF_{IDEAL}$ to be outside one of its derived frequency ranges and adjust the clock frequency to generate an accurate reply frequency.

Figure 9B:
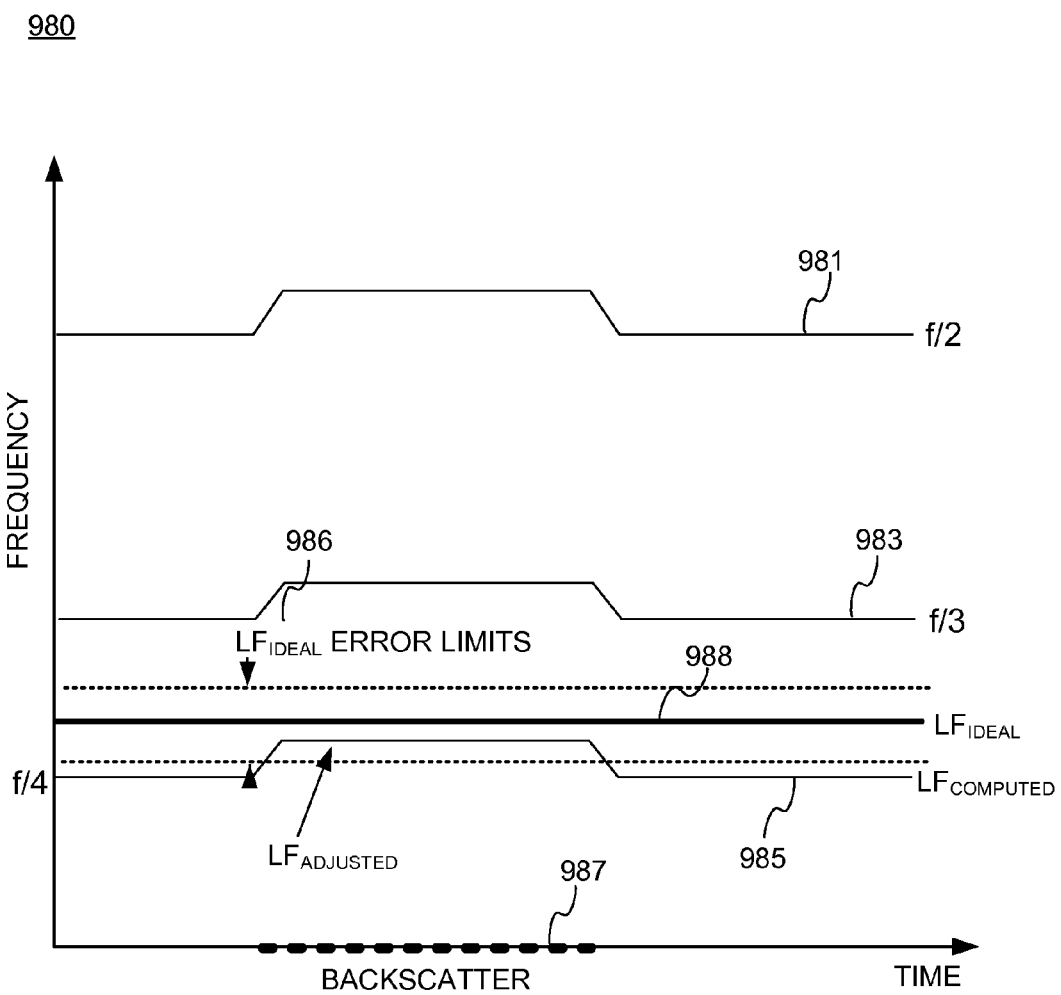
FIG. 9B illustrates how tag clock frequency may be increased depending on the expected variation of the computed backscatter frequency from the commanded backscatter frequency in a tag according to embodiments.

FIG. 9B illustrates how tag clock frequency may be increased depending on the expected variation of the computed backscatter frequency from the commanded backscatter frequency in a tag according to embodiments.

In diagram 980, available example tag reply frequencies f/2 (981), f/3 (983) and f/4 (985) are all outside the acceptable reply frequency range 986 based on reader commanded reply frequency $LF_{IDEAL}$ 988. Thus, the tag may adjust its internal clock frequency such that one the available reply frequencies, f/4 (985) is within the acceptable range during backscattering period 987 and used as $LF_{ADJUSTED}$. Outside the backscattering period 987, the frequency is restored to its normal value ($LF_{COMPUTED}$). The modification in this example scenario is an increase of the frequency. Indeed, there are two mechanisms assisting the tag to comply with the reply frequency limits here. The first one is the selection of the integer, N (=4), for determining which fraction of the internal clock frequency is to be used for reply frequency. The second mechanism is the adjustment of the selected fraction during the backscatter period to further bring the reply frequency into compliance with the reader commanded reply frequency requirement(s).

Figure 9C:
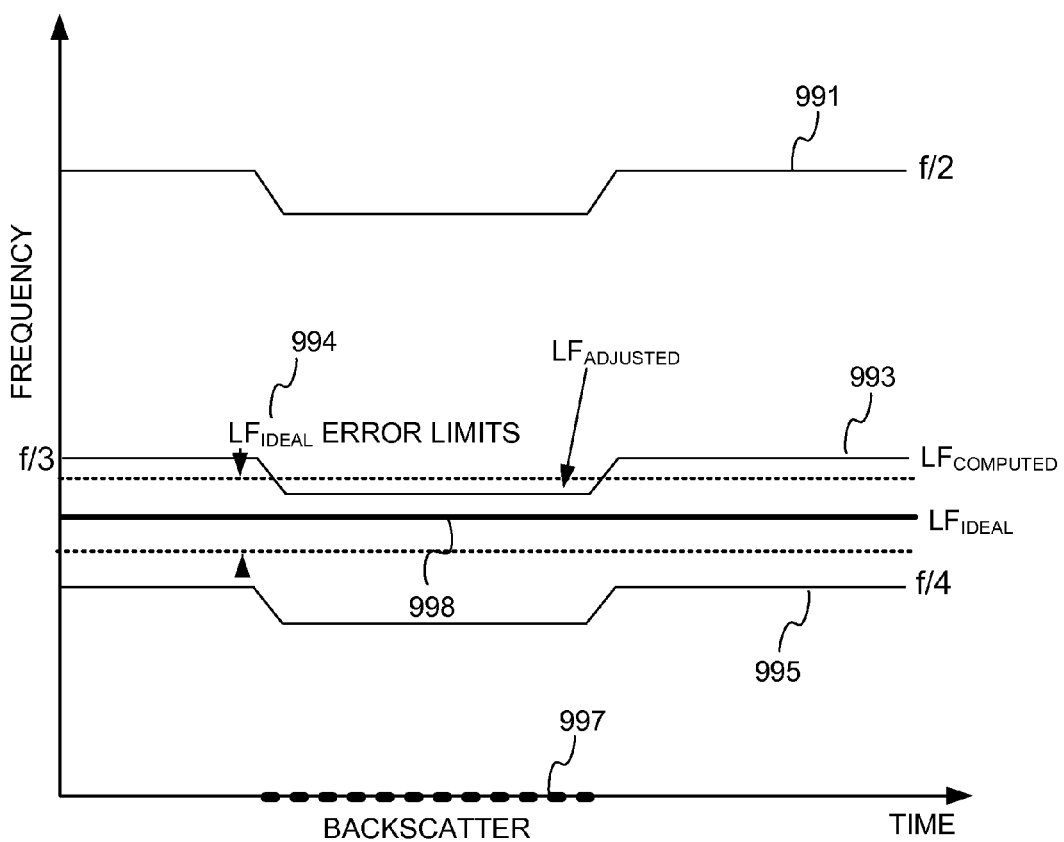
FIG. 9C illustrates how tag clock frequency may be decreased depending on the expected variation of the computed backscatter frequency from the commanded backscatter frequency in a tag according to embodiments.

FIG. 9C illustrates how tag clock frequency may be decreased depending on the expected variation of the computed backscatter frequency from the commanded backscatter frequency in a tag according to embodiments.

Diagram 990 is similar to diagram 980 illustrating adjustment of available example tag reply frequencies f/2 (991), f/3 (993), and f/4 (995), where the reader commanded frequency $LF_{IDEAL}$ (998) and its range of acceptable reply frequencies (994) do not coincide with any of the unadjusted available reply frequencies. Differently from diagram 980, the tag decreases the internal clock frequency and corresponding available reply frequencies resulting in f/3 (993) being selected as the $LF_{COMPUTED}$ and its adjusted version $LF_{ADJUSTED}$ during the backscatter period 997.

The adjustments shown in diagrams 980 and 990 include restoration of the tag clock frequency at the end of the backscattering period. Embodiments are not so limited, however. According to some embodiments, the adjusted clock frequency may remain at its adjusted value even after the backscatter period. According to other embodiments, the tag may lower its clock frequency earlier than the beginning of the backscatter period (e.g. upon detecting a low data rate from the reader). According to further embodiments, the change in clock frequency may be in increments or decrements at multiple steps before, during, and after the backscatter period.

Figure 10:
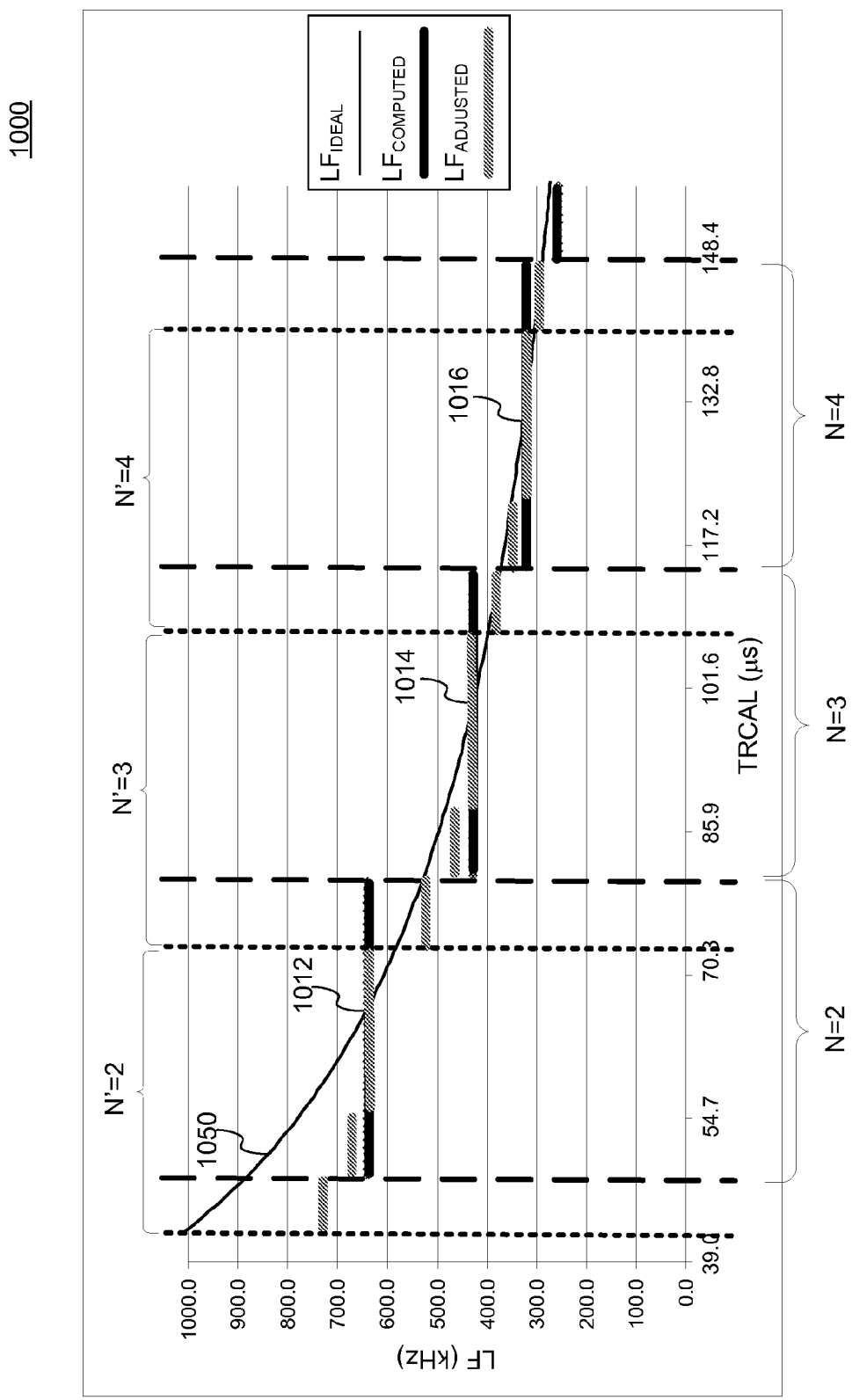
FIG. 10 is a diagram illustrating an improvement of computed tag backscatter frequencies with clock adjustment in a tag according to embodiments.

FIG. 10 is a diagram illustrating an improvement of computed tag backscatter frequencies with clock adjustment in a tag according to embodiments. Diagram 1000 shows reader commanded tag reply frequency. $LF_{IDEAL}$ 1050, across TRcal (time) axis as in diagram 600 of FIG. 6. As discussed in FIG. 6, fixed ranges of reply frequencies for $LF_{COMPUTED}$ are shown as dark bars, which may result in reply frequency errors outside the predefined limits for some N values.

According to embodiments, the error in tag reply frequency may be minimized in two ways: (1) modification of the computation of N as discussed above may reduce the error as presented by the lighter colored multiple steps of reply frequencies as opposed to previous single set of frequencies for each N (e.g. 1012, 1014, 1016, and 1018); and (2) the adjustment of tag clock frequency may reduce the error further as shown by the shift of reply frequency ranges along the TRcal axis (new ranges N'=2, N'=3, N'=4, etc. versus original ranges N=2, N=3, N=4, etc.). While the example diagram is shown for DR=64/3, other DR values and N computation approaches may be employed according to embodiments.

According to one example embodiment, computation of N may be modified as (where TRcal is TRcal(count)):

if Floor(TRcal/DR)>=32

$$N=\text{Floor}(TRcal/DR+0.5) \quad [2]$$

else $$N=\text{Floor}(TRcal/DR+0.75) \quad [3]$$

According to another example embodiment, the clock frequency adjustment may be determined based on:

Floor(TRcal/DR) and Mod(TRcal/DR)=TRcal/DR−Floor(TRcal/DR). [4]

These are example formulas for determining frequency adjustment and do not constitute a limitation on embodiments. Other computations may be performed with different functions, offset values, and the like according to other embodiments. Table 1 below (page 20) illustrates example frequency adjustment values based on the example formula [4] above.

Figure 11:
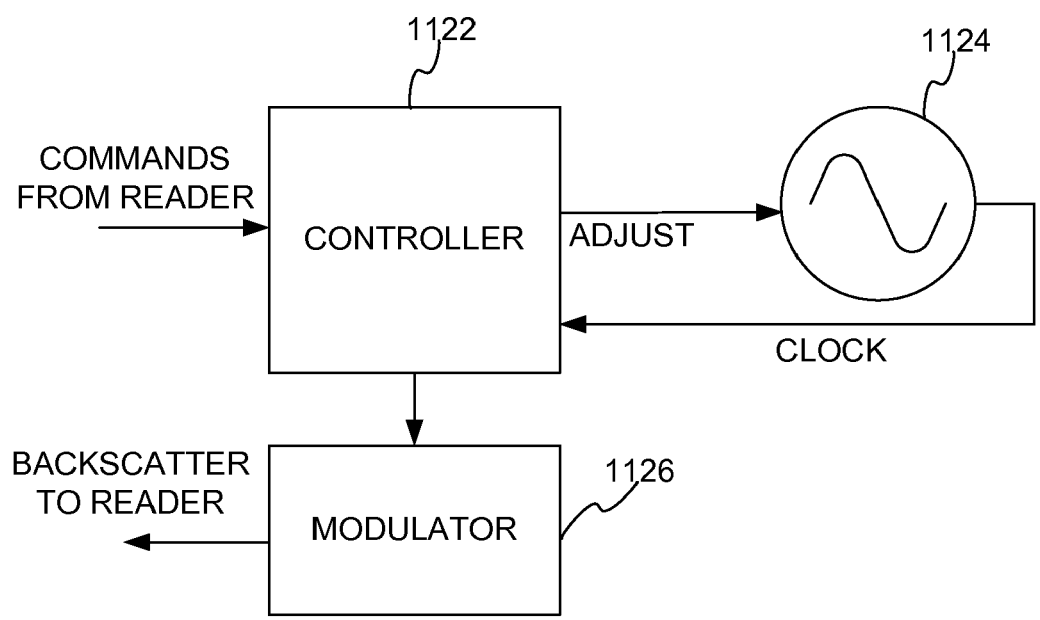
FIG. 11 illustrates example tag circuitry for adjustment of tag clock frequency according to one embodiment.

FIG. 11 illustrates example tag circuitry for adjustment of tag clock frequency according to one embodiment. Tag frequency may be generated and adjusted employing a number of different circuits. Circuit 1100 is an example implementation.

In tag circuit 1100, commands from the reader are received at controller 1122, which controls tag oscillator 1124. Upon determining an adjustment is needed as discussed previously, controller 1122 directs oscillator 1124 to adjust the clock frequency. The adjustment may include incrementing or decrementing the clock frequency. Once the controller 1122 receives the adjusted clock frequency from oscillator 1124, it derives adjusted reply frequency, $LF_{ADJUSTED}$, and instructs modulator 1126 of the tag to backscatter to the reader using $LF_{ADJUSTED}$.

TABLE 1

Example Frequency Adjustment Values (based on TRcal(count))

| Floor(TRcal/DR) >=Value | Mod(TRcal/DR) >=Value | Frequency Adjust (%) |
|---|---|---|
| 0 | 0 | 0 |
|  | 0.25 | 10 |
|  | 0.5 | 6 |
|  | 0.75 | 0 |
| 8 | 0 | 0 |
|  | 0.25 | 6 |
|  | 0.5 | 4 |
|  | 0.75 | 0 |
| 13 | 0 | 0 |
|  | 0.25 | 4 |
|  | 0.5 | 2 |
|  | 0.75 | 0 |
| 20 | 0 | 0 |
|  | 0.25 | 2 |
|  | 0.5 | 2 |
|  | 0.75 | 0 |
| 32 | 0 | 0 |

Figure 12:
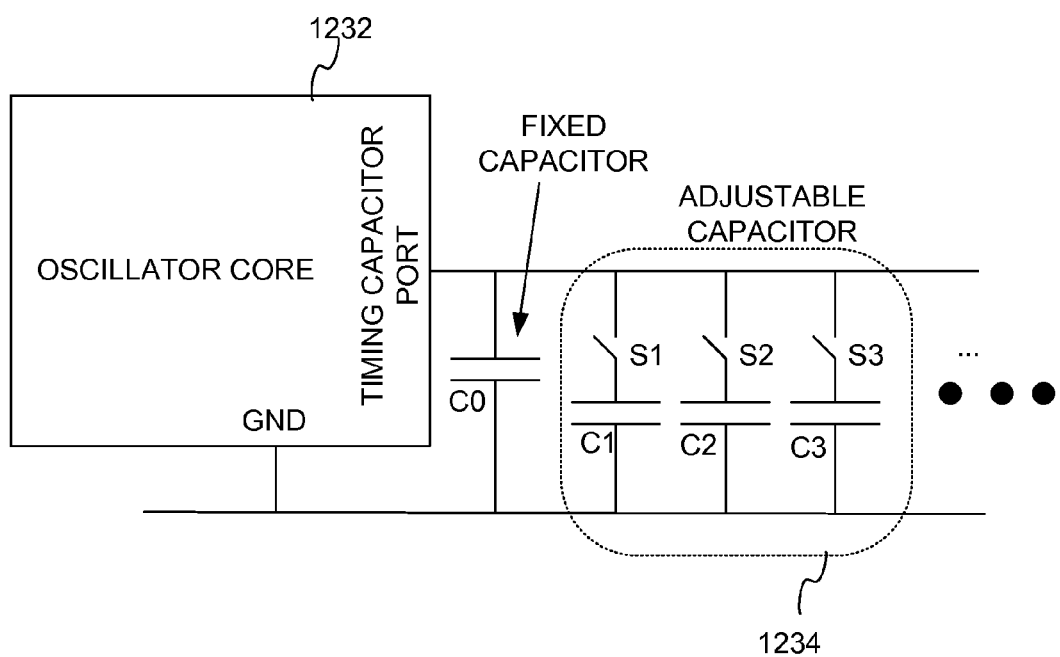
FIG. 12 illustrates example timing adjustment circuitry for adjustment of tag clock frequency according to one embodiment.

FIG. 12 illustrates example timing adjustment circuitry for adjustment of tag clock frequency according to one embodiment. Diagram 1200 includes a simplified depiction of an example timing adjustment circuit.

Oscillators where the frequency is generated partly by capacitors can be tuned by switching capacitors 1234 in and out. The controller may send the oscillator core circuit 1232 a signal to adjust frequency when the controller determines (by computing or by a look-up table) that the frequency commanded by the reader cannot be met. In response, the oscillator core circuit 1232 may switch one or more of capacitors 1234 out (to increase the frequency) or in (to decrease the frequency) as needed. When backscattering is completed, the controller may set the adjust signal back to the default value, and the oscillator may return to its original frequency.

It should be noted that embodiments are not limited to the example circuits discussed above. Tag clock frequency adjustment based on determining whether or not a tag reply frequency based on the current tag clock frequency meets a predefined limit may be implemented using any other controller or oscillator circuit known in the art.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

We claim:

1. A method for a Radio Frequency Identification (RFID) tag configured to communicate with an RFID reader, the method comprising:
   receiving a command from the reader, the command indicating a commanded reply frequency ($LF_{IDEAL}$) for the tag;
   determining an integer number through dividing a current clock frequency of the tag by the $LF_{IDEAL}$;
   determining a computed reply frequency ($LF_{COMPUTED}$) based on dividing the current clock frequency of the tag by the integer number;
   determining if the $LF_{COMPUTED}$ meets a predefined limit for a deviation of the $LF_{COMPUTED}$ from the $LF_{IDEAL}$;
   if the $LF_{COMPUTED}$ does not meet the predefined limit,
      adjusting the current clock frequency of the tag prior to backscattering a reply signal,
      determining an adjusted reply frequency ($LF_{ADJUSTED}$) based on the adjusted clock frequency, and
      backscattering the reply signal employing the $LF_{ADJUSTED}$.

2. The method of claim 1, further comprising:
   if the current clock frequency is adjusted, restoring the clock frequency upon completion of the backscattering.

3. The method of claim 1, wherein adjusting the current clock frequency includes one of increasing the clock frequency and decreasing the clock frequency based on whether the $LF_{COMPUTED}$ is lower or higher than $LF_{IDEAL}$.

4. The method of claim 1, wherein determining the integer number includes determining a remainder.

5. The method of claim 4, further comprising:
   adjusting the current clock frequency of the tag based on the remainder.

6. The method of claim 4, further comprising:
   adjusting the current clock frequency of the tag based on one of a predefined function and a look-up table.

7. The method of claim 4, wherein adjusting the current clock frequency further comprises modifying the integer number.

8. The method of claim 4, wherein adjusting the current clock frequency further comprises one of: adjusting the current clock frequency based on a comparison of the remainder to a set of predefined values.

9. The method of claim 1, wherein the $LF_{COMPUTED}$ is determined from a TRCAL value and a DR value of the reader command.

10. The method of claim 1, wherein the current clock frequency is adjusted such that the adjusted clock frequency of the tag is a non-integer multiple of the $LF_{ADJUSTED}$.

11. The method of claim 1, further comprising:
   if the $LF_{COMPUTED}$ meets the predefined limit, backscattering employing the $LF_{COMPUTED}$.

12. A Radio Frequency Identification (RFID) tag configured to communicate with an RFID reader, the tag comprising:
   a transceiver arranged to transmit and receive a modulated wave for communicating with the reader;
   a processing block coupled to the transceiver, the processing block arranged to:
      receive a command from the reader, the command indicating a commanded reply frequency ($LF_{IDEAL}$) for the tag;
      determine an integer number through dividing a current clock frequency of the tag by the $LF_{IDEAL}$;
      determine a computed reply frequency ($LF_{COMPUTED}$) based on dividing the current clock frequency of the tag by the integer number;
      determine if the $LF_{COMPUTED}$ meets a predefined limit for a deviation of the $LF_{COMPUTED}$ from the $LF_{IDEAL}$;
      if the $LF_{COMPUTED}$ meets the predefined limit,
         cause the transceiver to backscatter a reply signal employing the $LF_{COMPUTED}$, else
         adjust the current clock frequency of the tag prior to backscattering the reply signal,
         determine an adjusted reply frequency ($LF_{ADJUSTED}$) based on the adjusted clock frequency, and
         cause the transceiver to backscatter a reply signal employing the $LF_{ADJUSTED}$; and
      if the current clock frequency is adjusted, restore the clock frequency upon completion of the backscattering.

13. The RFID tag of claim 12, wherein the current clock frequency is adjusted by one of increasing the clock frequency and decreasing the clock frequency based on whether the $LF_{COMPUTED}$ is lower or higher than $LF_{IDEAL}$.

14. The RFID tag of claim 12, wherein the processing block is further arranged to:
   determine a remainder through dividing the current clock frequency of the tag by the $LF_{IDEAL}$.

15. The RFID tag of claim 14, wherein the processing block is further arranged to:
   adjust the current clock frequency of the tag based on employing one of a predefined function and a look-up table for determining a new clock frequency value using the remainder.

16. The RFID tag of claim 14, wherein the processing block is further arranged to adjust the current clock frequency by modifying the integer number.

17. A semiconductor chip for a Radio Frequency Identification (RFID) tag configured to communicate with an RFID reader, the chip comprising:
   a processor coupled to a transceiver of the tag, the processor arranged to:
      receive a command from the reader, the command indicating a commanded reply frequency ($LF_{IDEAL}$) for the tag;
      determine an integer number through dividing a current clock frequency of the tag by the $LF_{IDEAL}$;
      determine a computed reply frequency ($LF_{COMPUTED}$) based on dividing the current clock frequency of the tag by the integer number;
      determine if the $LF_{COMPUTED}$ meets a predefined limit for a deviation of the $LF_{COMPUTED}$ from the $LF_{IDEAL}$;
      if the $LF_{COMPUTED}$ does not meet the predefined limit,
         adjust the current clock frequency of the tag prior to backscattering a reply signal,
         determine an adjusted reply frequency ($LF_{ADJUSTED}$) based on the adjusted clock frequency, and cause the transceiver to backscatter the reply signal employing the $LF_{ADJUSTED}$.

18. The semiconductor chip of claim 17, wherein the current clock frequency is adjusted by one of increasing the clock frequency and decreasing the clock frequency based on whether the $LF_{COMPUTED}$ is lower or higher than $LF_{IDEAL}$.

19. The semiconductor chip of claim 17, wherein the processor is further arranged to:

determine a remainder through dividing the current clock frequency of the tag by the $LF_{IDEAL}$.

20. The semiconductor chip of claim 19, wherein the processor is further arranged to:

adjust the current clock frequency of the tag based on employing one of a predefined function and a look-up table for determining a new clock frequency value using the remainder.

21. The semiconductor chip of claim 19, wherein the processor is further arranged to adjust the current clock frequency by modifying the integer number.

22. The semiconductor chip of claim 19, wherein the processor is further arranged to adjust the current clock frequency by one of: incrementing and decrementing the current clock frequency based on a comparison of the remainder to a set of predefined values.

* * * * *